United States Patent [19]

Takahashi et al.

[11] 4,310,859
[45] Jan. 12, 1982

[54] PAPER CUTTER FOR FACSIMILE APPARATUS

[75] Inventors: Shuichi Takahashi; Mitsuru Kondo, both of Tokyo, Japan

[73] Assignee: Ricoh Company, Ltd., Tokyo, Japan

[21] Appl. No.: 194,301

[22] Filed: Oct. 6, 1980

[30] Foreign Application Priority Data

Oct. 20, 1979 [JP] Japan ................................ 54-134734

[51] Int. Cl.³ .............................................. H04N 1/31
[52] U.S. Cl. ...................................... 358/304; 358/256
[58] Field of Search ................ 358/293, 280, 304, 256

[56] References Cited

U.S. PATENT DOCUMENTS 3,566,022 2/1971 Bishop ............................. 358/304
4,142,214 2/1979 Yamazaki ......................... 358/304

Primary Examiner—Howard Britton
Attorney, Agent, or Firm—David G. Alexander

[57] ABSTRACT

A manual switch (11) is movable between a first position in which a cutter (26) is energized to cut a roll of paper (24) in response to an end of transmission of a single facsimile image or in response to an end of transmission of a plurality of facsimile images such as a multi-page document. The switch (11) is further movable to another position at which the cutter (26) is de-energized under all condition.

3 Claims, 3 Drawing Figures

PAPER CUTTER FOR FACSIMILE APPARATUS

BACKGROUND OF THE INVENTION

The present invention relates to a multi-mode cutter for a facsimile apparatus.

In a typical facsimile transceiver, recording paper is provided in the form of a roll and is cut after recording of a facsimile image. Two types of cutting systems have been known in the prior art. In the first system, the cutter automatically cuts the paper in response to an end of transmission of a facsimile image. In the second system, the paper is cut manually by an operator.

With the manual cutting system, it is easy to become confused during continuous transmission of many images and cut the paper in the wrong place. With the automatic cutting system, it is not possible to cut the paper at places other than between each reproduced image.

For example, it is sometimes desired to cut the paper after reproduction of a plurality of images such as a multi-page document. This cannot be accomplished by the conventional automatic cutting system. In another case, many small documents such as bills may be transmitted in a short period of time from several other stations. In the conventional automatic cutting system, the reproduced bills are automatically cut to produce small and irregularly sized sheets. These become mixed up and are difficult to file due to the irregular sizes.

SUMMARY OF THE INVENTION

A facsimile reception apparatus embodying the present invention includes printing means for reproducing received facsimile images on a continuous roll of paper and cutter means for cutting the paper in response to a cut signal, and is characterized by comprising first means for generating the cut signal in response to an end of recording of a single facsimile image second means for generating the cut signal in response to an end of recording of a plurality of facsimile images, and switch means for selectively enabling one of the first and second means.

The switch means is further operative to inhibit both of the first and second means.

In accordance with the present invention, a manual switch is movable between a first position in which a cutter is energized to cut a roll of paper in response to an end of transmission of a single facsimile image or in response to an end of transmission of a plurality of facsimile images such as a multi-page document. The switch is further movable to another position at which the cutter is de-energized under all conditions.

It is an object of the present invention to provide a facsimile apparatus comprising a multi-mode sheet cutting means which enables cutting of a roll of recording paper in a mode which is selected by the operator.

It is another object of the present invention to provide a generally improved facsimile apparatus.

Other objects, together with the foregoing, are attained in the embodiment described in the following description and illustrated in the accompanying drawing.

DESCRIPTION OF THE PREFERRED EMBODIMENT

While the facsimile apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
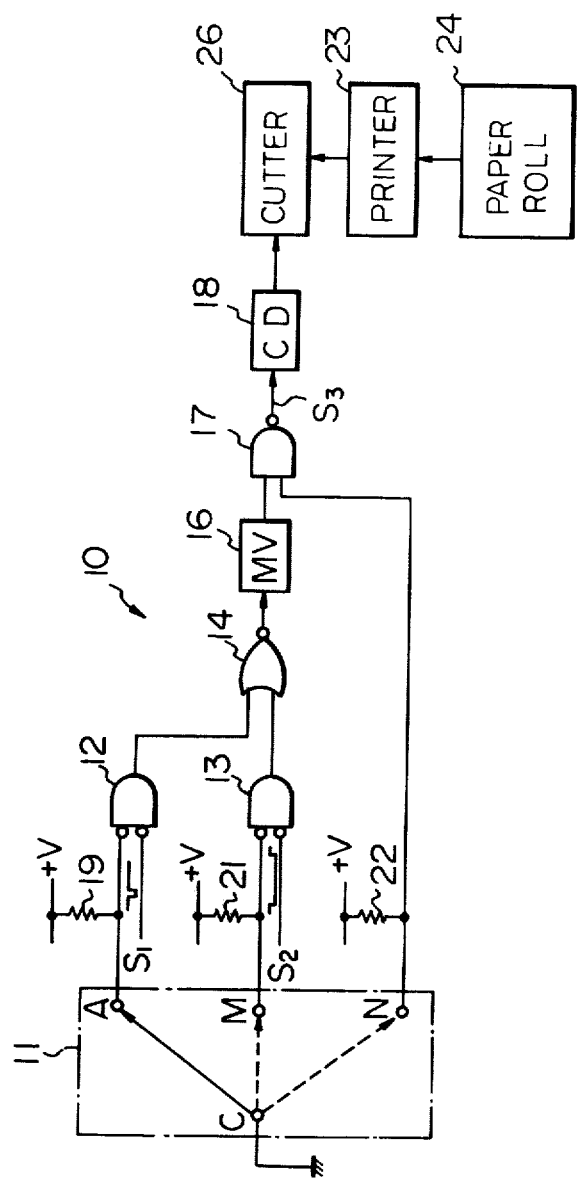
FIG. 1 is an electrical schematic diagram, partially in block form, of a facsimile apparatus embodying the present invention.

Referring now to FIG. 1, a facsimile apparatus embodying the present invention is generally designated by the reference numeral 10 and comprises a mode selector switch 11, NOR gates 12 to 14, a monostable multivibrator 16, a NAND gate 17, a cutter drive 18, pull-up resistors 19, 21 and 22, a printer 23 for printing or recording facsimile images on a roll of paper 24 and a cutter 26 for cutting the paper 24 after a facsimile image is printed thereon by the printer 23.

In a single image mode, the operator moves a grounded movable contact C of the switch 11 to engage with a fixed contact A. This applies a low input to the NOR gate 12 while high inputs are applied to the NOR gate 13 and NAND gate 17 by the pull-up resistors 21 and 22 respectively.

Figure 2:
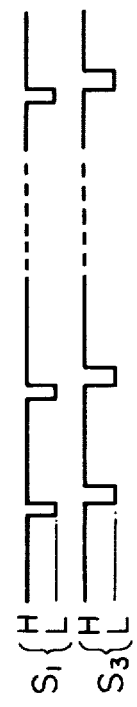
FIG. 2 is a timing diagram illustrating the operation of the apparatus in a single image mode.

A transmitting facsimile apparatus (not shown) generates a pulse signal S1 after the transmission of a facsimile image of a single original document page which is applied to the NOR gate 12. The NOR gate 12 inverts the pulse S1 which is inverted again by the NOR gate 14 and applied to the multivibrator 16. In response to the trailing (rising) edge of the pulse, the multivibrator 16 generates a positive output pulse which is inverted by the NAND gate 17 and applied to the cutter drive 18 as a negative cutter drive pulse S3. In response to the pulse S3, the cutter drive 18 energizes the cutter 26 to cut the paper 24. This operation is illustrated in FIG. 2. As a result, the paper 24 is cut after the facsimile image of the document page is reproduced thereon by the printer 23 to produce a finished facsimile reproduction in the form of a sheet. This operation is repeated in response to the end of transmission and reproduction of each facsimile image constituting a document page, since a pulse S1 is generated at the end of each such operation.

It is also desirable to reproduce a plurality of images on the paper 24 without cutting the paper 24 between the individual images, such as where it is desired to reproduce a multi-page document. In this case, the operator moves the contact C of the switch 11 to engage with a fixed contact M. As the result of this operation, the status of the NOR gates 12 and 13 is reversed. In the previous case, the NOR gate 12 was enabled by a low input whereas the NOR gate 13 was inhibited by a high input. For multi-image reproduction with the contacts C and M in engagement, however, the NOR gate 13 is enabled whereas the NOR gate 12 is inhibited.

Figure 3:
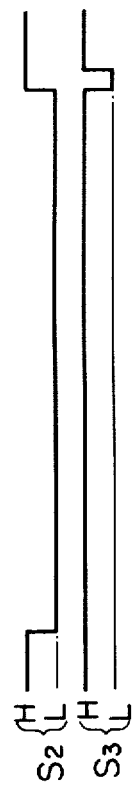
FIG. 3 is a timing diagram illustrating the operation of the apparatus in a multi-image mode.

The transmitting facsimile apparatus (not shown) is further arranged to produce a signal S2 which is logically low during transmission of a plurality or set of facsimile images such as the pages of a multi-page document. A selector switch (not shown) may be provided at the transmitting apparatus to select between the single page mode or the multi-page mode. In accordance with the position of the switch, the transmitting apparatus will produce either the signals S1 after transmission of each respective page or the signal S2 which remains low during transmission of all of the pages. Alternatively, the transmitter may transmit a signal which is low as long as a new original document page is not inserted into a scanner (not shown) within a predetermined length of time after scanning a previous document page, thus producing the signal S2. The multipage operation is illustrated in FIG. 3.

The signal S2 is gated through the NOR gate 13 in the same manner as the signal S1 is gated through the NOR gate 12 and produces the same result. The cutter 26 is driven to cut the paper 24 in response to the trailing (rising) edge of the signal S2. Thus, the cutter 26 cuts the paper after reproduction of the set of facsimile images such as a multi-page document. In other words, several images are reproduced on an elongaged sheet.

The contact C of the switch 11 may be moved to engage with a fixed contact N to inhibit the cutter 26 under all conditions. This has the effect of applying a low input to the NAND gate 17 so that the output of the NAND gate 17 will remain high regardless of the status of the signals S1 and S2. This feature allows the operator to prevent the paper 24 from being cut and produce any desired number of facsimile images on an elongated sheet of paper.

Although the switch 11 has been shown and described as being operated manually, it may alternatively be constructed to operate automatically in response to control signals from the transmitter.

In summary, it will be seen that the present invention provides an improved facsimile apparatus comprising cutting means which may be operated in a plurality of modes under operator control, thereby overcoming the drawbacks and limitations of the prior art. Various modifications will become possible for those skilled in the art after receiving the teachings of the present disclosure without departing from the scope thereof.

What is claimed is:

1. A facsimile reception apparatus including printing means for reproducing received facsimile images on a continuous roll of paper and cutter means for cutting the paper in response to a cut signal, characterized by comprising:

first means for generating the cut signal in response to an end of recording of a single facsimile image;

second means for generating the cut signal in response to an end of recording of a plurality of facsimile images; and switch means for selectively enabling one of the first and second means.

2. An apparatus as in claim 1, in which the switch means is further operative to inhibit both of the first and second means.

3. An apparatus as in claim 1 or 2, in which the switch means comprises a manual switch.

* * * * *